United States Patent [19]

Straub

[11] Patent Number: 6,055,855
[45] Date of Patent: May 2, 2000

[54] TIRE PRESSURE SENSOR WHEEL ATTACHMENT APPARATUS

[75] Inventor: Albert M. Straub, Ann Arbor, Mich.

[73] Assignee: TRW Inc., Lyndhurst, Ohio

[21] Appl. No.: 09/320,314

[22] Filed: May 26, 1999

[51] Int. Cl.[7] .................................................. B60C 23/02
[52] U.S. Cl. .................... 73/146.8; 73/146.2; 73/146.4
[58] Field of Search .................... 73/146, 146.2, 73/146.3, 146.4, 146.5, 146.8; 152/152.1; 116/30

[56] References Cited

U.S. PATENT DOCUMENTS

| | | |
|---|---|---|
| 4,763,517 | 8/1988 | Feinberg . |
| 5,083,457 | 1/1992 | Schultz .................................... 73/146.5 |
| 5,837,891 | 11/1998 | Bridge ..................................... 73/146.8 |
| 5,844,131 | 12/1998 | Gabelmann et al. ................... 73/146.8 |

*Primary Examiner*—Benjamin R. Fuller
*Assistant Examiner*—Abdullahi Aw-musse
*Attorney, Agent, or Firm*—Tarolli, Sundheim, Covell, Tummino & Szabo L.L.P.

[57] ABSTRACT

An apparatus 10 mounts on a rim 11 of a vehicle wheel 13 on which a tire 12 may be mounted. The apparatus 10 comprises a tire pressure sensor 20, a first threaded fastener 30, and a tire valve stem 40. The tire pressure sensor 20 senses the pressure in the tire 12 and has a housing 21 with a pocket 22. The first threaded fastener 30 is mounted in the pocket 22 in the housing 21 and has a first threaded portion 31 extending along an axis 100. The first threaded fastener 30 and the housing 21 have surfaces 25, 26, 35 blocking rotation of the first threaded fastener 30 about the axis 100. The tire valve stem 40 projects through a first opening 17 in the rim 11 and through a second opening 27 in the housing 21 into the pocket 22. The tire valve stem 40 has a second threaded portion 41 for threaded engagement with the first threaded portion 31 upon relative rotation of the first 31 and second threaded portions 41 about the axis 100. The tire valve stem 40 and the first threaded fastener 30 clamp a part 21a of the housing 21 between the tire valve stem 40 and the first threaded fastener 30 when the first 31 and second 41 threaded portions are threaded together.

10 Claims, 2 Drawing Sheets

TIRE PRESSURE SENSOR WHEEL ATTACHMENT APPARATUS

TECHNICAL FIELD

The present invention relates to an apparatus for sensing the pneumatic pressure in a tire of a vehicle, and particularly to the attachment of a tire pressure sensor to a rim of a vehicle wheel.

BACKGROUND OF THE INVENTION

It is known to attach a tire pressure sensor to a rim of a vehicle wheel. The known tire pressure sensor includes a sensor housing. The sensor housing contains an electronic tire pressure sensor and a power source, such as a battery. The tire pressure sensor senses the air pressure in the tire and transmits a signal to a receiver outside the tire. The receiver evaluates the signal and provides an alarm to a vehicle occupant if the pressure in the tire is too low.

The sensor housing is connected to a tire valve stem which extends through an opening in the wheel rim. The sensor housing is fixed to the tire valve stem by a screw which bears against one side of the sensor housing. The screw threads into the tire valve stem. The sensor housing is clamped between the screw head and the tire valve stem. Vibration can cause the screw to loosen and separate from the tire valve stem.

SUMMARY OF THE INVENTION

The present invention is an apparatus for mounting on a rim of a vehicle wheel on which a tire may be mounted. The apparatus comprises a pressure sensor, a first threaded fastener, and a tire valve stem. The pressure sensor senses the pressure in the tire. The pressure sensor includes a housing with an external pocket. The first threaded fastener is mounted in the pocket in the housing and has a first threaded portion extending along an axis. The first threaded fastener and the housing have surfaces blocking rotation of the first threaded fastener about the axis. The tire valve stem projects through a first opening in the rim and through a second opening in the housing into the pocket. The tire valve stem has a second threaded portion for threaded engagement with the first threaded portion upon relative rotation of the first and second threaded portions about the axis. The tire valve stem and the first threaded fastener clamp a part of the housing between the tire valve stem and the first threaded fastener when the first and second threaded portions are threaded together.

BRIEF DESCRIPTION OF THE DRAWINGS

The foregoing and other features of the invention will become more apparent to one skilled in the art upon consideration of the following description of the invention and the accompanying drawings in which.

DESCRIPTION OF A PREFERRED EMBODIMENT

Figure 1:
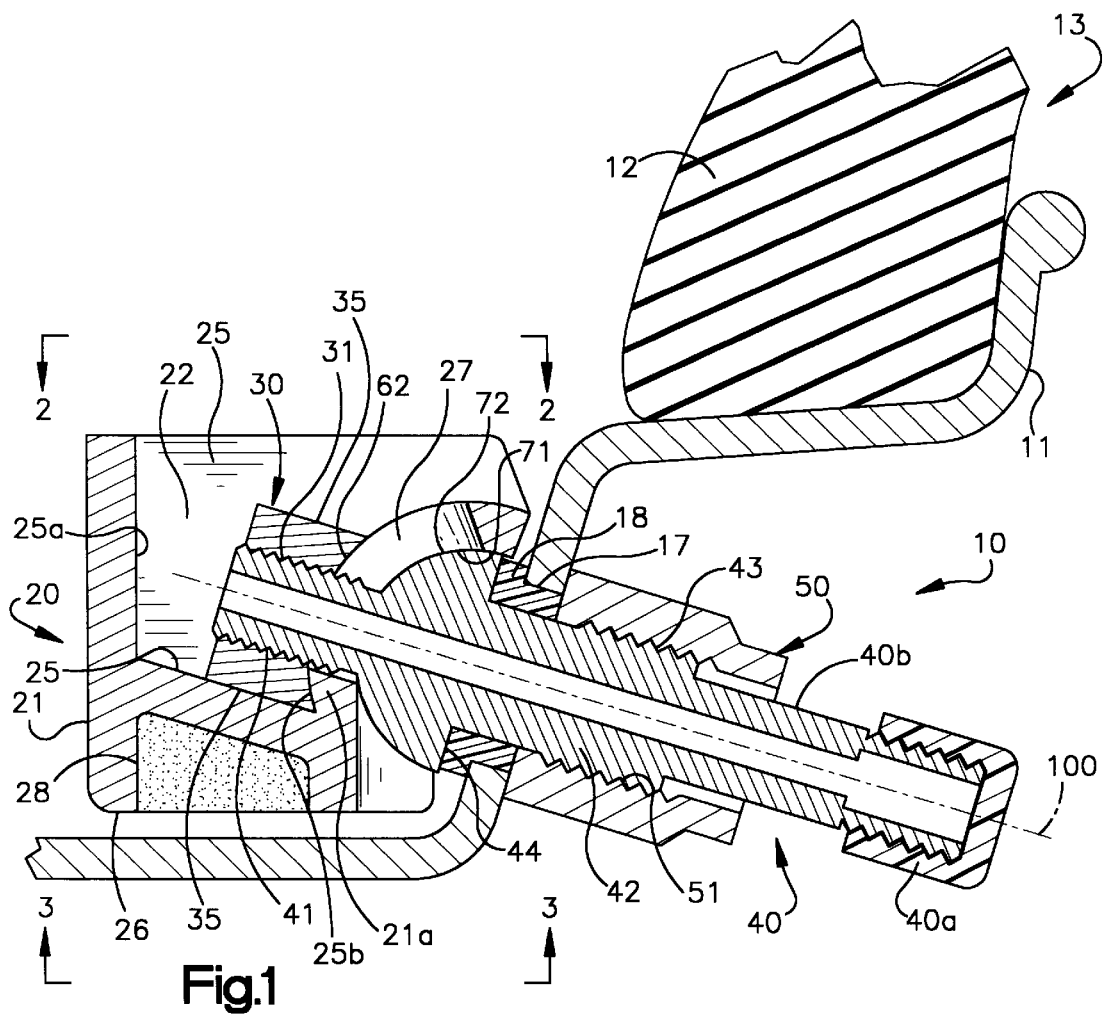
FIG. 1 is a sectional view of an apparatus embodying the present invention and associated with a first vehicle wheel rim.

The present invention is an apparatus 10 for mounting on a rim 11 of a vehicle wheel 13 on which a tire 12 may be mounted. The apparatus 10 (FIG. 1) comprises a tire pressure sensor 20, a first threaded fastener 30, and a tire valve stem 40.

The tire pressure sensor 20 includes electronic circuitry which senses the pressure in the tire 12. The electronic circuitry of the tire pressure sensor 20 is located in a chamber 28 in a housing 21 of the tire pressure sensor 20. The electronic circuitry is potted in the chamber 28. If the air pressure in the tire reduces to a predetermined threshold, the electronic circuitry will provide a signal to a receiver which actuates an alarm, such as a light on the vehicle instrument panel, to apprise a vehicle occupant of the pressure reduction.

The housing 21 has an external pocket 22 separated from the chamber 28. The pocket is defined by three planar surfaces 25 of the housing 21. The pocket 22 is also defined by a planar surface 25a of the housing 21 which extends between the planar surfaces 25. The pocket 22 is further defined by a cylindrical surface 25b of a portion 21a of the housing 21. The cylindrical surface 25b is opposite the planar surface 25a. An elongate slot 27 extends through the portion 21a of the housing 21. The pocket 22 is open at its top as viewed in the drawings. Therefore, the pocket is accessible from outside the housing 21.

The first threaded fastener 30 is inserted into the pocket 22 in the housing 21 through the open top of the pocket. The fastener 30 has a first threaded portion 31 extending along an axis 100. The first threaded fastener 30 is a nut and the first threaded portion 31 is an internally threaded passage through the nut. The nut 30 has a square outer configuration defined by four planar surfaces 35. The nut 30 has a cylindrical face surface 62 with a curvature corresponding to the curvature of the cylindrical surface 25b of the housing portion 21a. The cylindrical surfaces 25b and 62 face each other.

The tire valve stem 40 has a known valve (not shown) located in a passage extending through the tire valve stem 40. The valve permits air to be directed into the tire 12 and blocks leakage through the passage from the tire 12. A dust cap 40a threads onto the end of the tire valve stem 40 to protect the valve, as is known. The tire valve stem 40 also includes wrenching flats 40b, as are known.

The tire valve stem 40 projects through a first opening 17 in the rim 11 and through the slot 27 in the housing portion 21a into the pocket 22. The tire valve stem 40 has a second threaded portion 41 for threaded engagement with the first threaded portion 31 of the nut 30 upon relative rotation of the first 31 and second 41 threaded portions about the axis 100. The second threaded portion 41 is an externally threaded portion of the tire valve stem 40. The tire valve stem 40 and the nut 30 clamp the portion 21a of the housing 21 between the tire valve stem 40 and the nut 30 when the first 31 and second 41 threaded portions are tightly threaded together.

The housing portion 21a includes a first spherical surface 71. The tire valve stem 40 includes a second spherical surface 72 facing the spherical surface 71 and clamping against the first spherical surface 71 when the first 31 and second 41 threaded portions are threaded tightly together.

The tire valve stem 40 has a third threaded portion 42 with external threads 43 and a shoulder 44 projecting radially adjacent to the external threads 43. The spherical surface 72 is located on the shoulder 44. A nut 50 with internal threads 51 threadedly engages the third threaded portion 42 thereby clamping the rim 11 between the nut 50 and the shoulder 44 to secure the tire valve stem 40 and the housing 21 to the rim 11.

A gasket or seal ring 18 encircles the tire valve stem 40 and has a portion extending into the opening 17 in the rim 11 to form a pressure-tight seal between the parts when the first 31 and second 41 threaded portions are threaded together and the nut 50 is threaded onto the threaded portion 42 of the valve stem.

Figure 4:
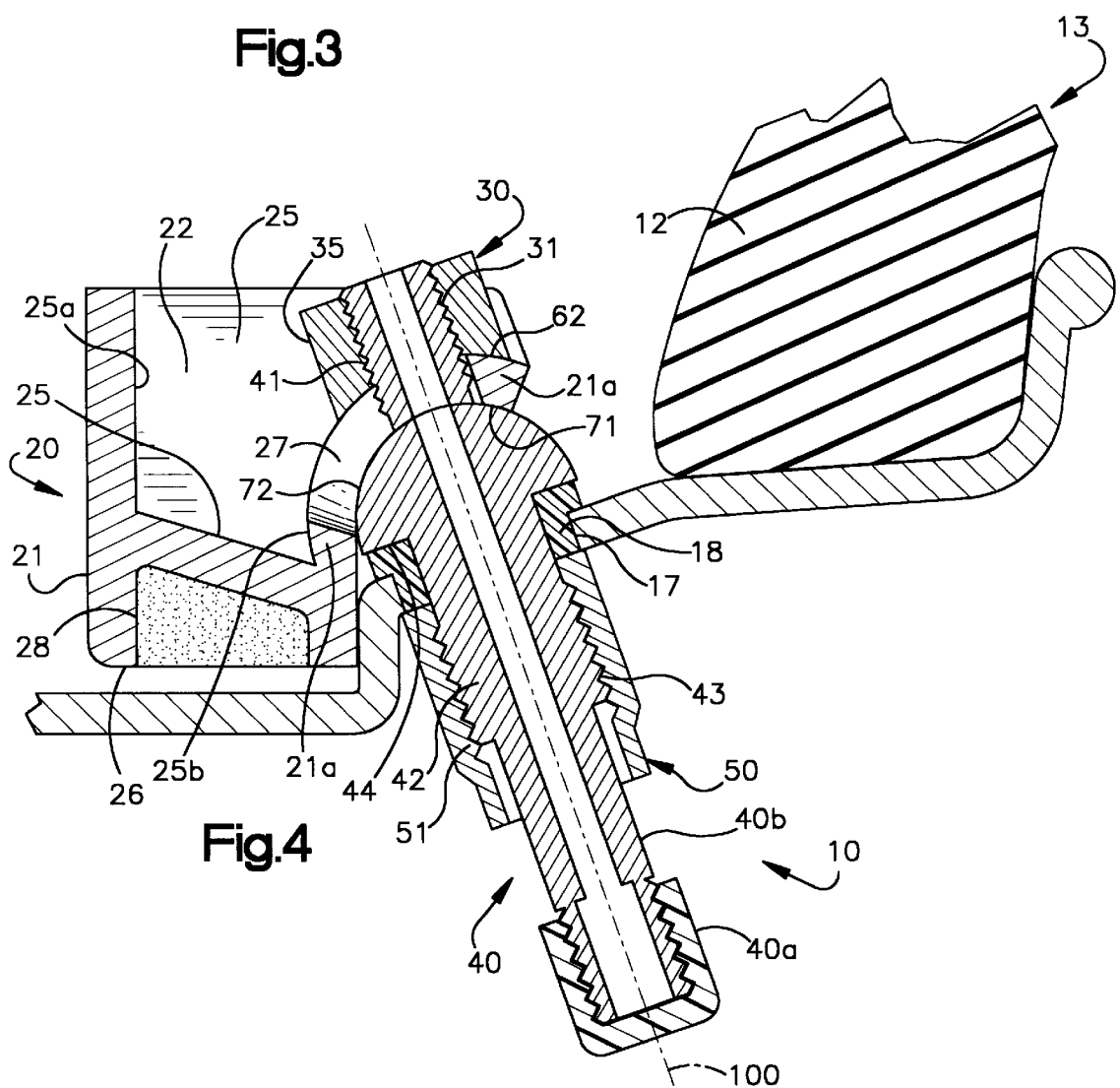
FIG. 4 is a sectional view of the apparatus of FIG. 1 associated with a second vehicle wheel rim.

The elongated slot 27 in the portion 21a of the housing 21 enables rotational adjustment of the tire valve stem 40 and the housing 21 relative to each other about an axis perpendicular to the axis 100. Thus, the elongated slot 27 allows the apparatus 10 to be used with different vehicle rims of varied shapes and dimensions, as shown in FIG. 1 and FIG. 4.

When assembling the parts, the nut 30 is first placed in pocket 22. The tire valve stem 40 is then inserted through the elongated slot 27 into the pocket. The tire valve stem 40 is rotated about axis 100 to loosely thread the nut 30 and tire valve stem 40 together. The tire valve stem 40 is then adjusted relative to the housing 21 by movement in the elongated slot 27 so that the tire valve stem 40 can extend through the opening 17 in the rim 11 and the housing 21 can be positioned relative to the rim 11 as shown in FIGS. 1 and 4. The nut 30 and tire valve stem 40 are then tightly threaded together. The housing 21, nut 30, and tire valve stem 40 are then a unitary assemblage.

The tire valve stem 40 is then inserted through the opening 17 in the rim 11. The nut 50 is threaded onto the tire valve stem 40 to secure the parts in the position shown in FIGS. 1 and 4.

When assembled, the planar surfaces 25, 35 of the housing 21 and the nut 30, respectively, block rotation of the nut 30 about the axis 100. This prevents the nut from turning about the axis 100 and separating from the tire valve stem 40.

Figure 2:
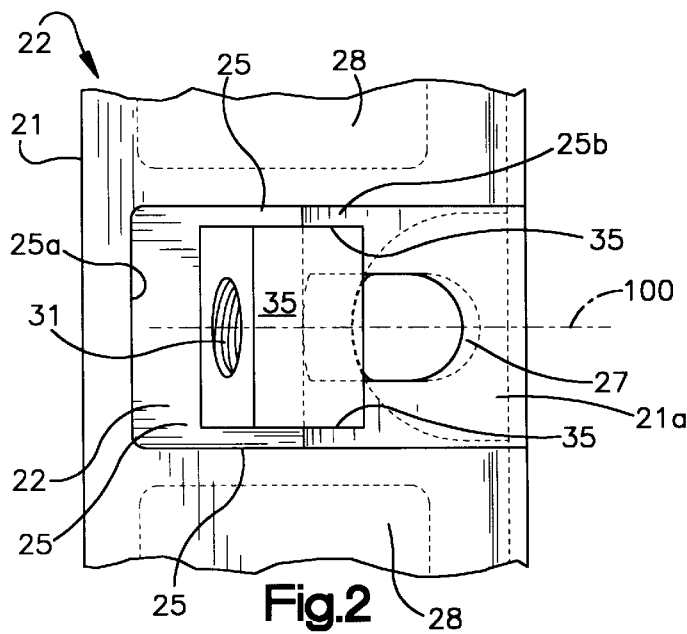
FIG. 2 is a sectional view taken along line 2—2 of FIG. 1 with parts removed.
Figure 3:
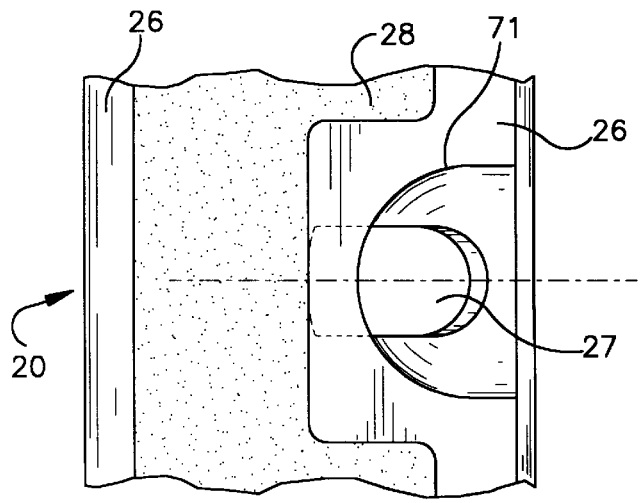
FIG. 3 is a sectional view taken along line 3—3 of FIG. 1 with parts removed.

The housing 21 includes planar surfaces 26 which face rim 11. The planar surfaces 26 will engage the rim 11 to block rotation of the housing 21 and the nut 30 about the axis 100 relative to the rim 11. The planar surfaces 25 of the nut 30 abut the planar surfaces 35 of the housing 21, and the planar surfaces 26 abut the rim 11, as shown in FIG. 1 and FIG. 2. Consequently, these planar surfaces 25, 26, 35 enable the tire pressure sensor 20 to be immune from loosening of the threaded connections do to vibration and maintain a secure connection between the apparatus 10 and the rim 11.

From the above description of the invention, those skilled in the art will perceive improvements, changes and modifications. Such improvements, changes and modifications are intended to be covered by the attached claims.

Having described the invention, the following is claimed:

1. Apparatus for mounting on a rim of a vehicle wheel on which a tire may be mounted, said apparatus comprising:

a pressure sensor for sensing the pressure in the tire, said pressure sensor having a housing with a pocket in said housing;

a threaded fastener mounted in said pocket in said housing, said threaded fastener having a threaded portion extending along an axis;

said threaded fastener and said housing having surfaces blocking rotation of said threaded fastener about said axis; and a tire valve stem for projecting through a first opening in the rim and through a second opening in said housing into said pocket, said tire valve stem having a threaded portion for threaded engagement with said threaded portion of said threaded fastener upon relative rotation of said threaded portion of said threaded fastener and said threaded portion of said valve stem about said axis, said tire valve stem and said threaded fastener clamping a part of said housing between said tire valve stem and said threaded fastener when said threaded portion of said threaded fastener and said threaded portion of said valve stem are threaded together.

2. The apparatus as defined in claim 1 wherein said second opening comprises an elongate slot in said part of said housing enabling adjustment of said tire valve stem and said housing.

3. The apparatus as defined in claim 2 wherein said part of said housing includes a first cylindrical surface, and said threaded fastener comprises a second cylindrical surface which clamps against said first cylindrical surface when said threaded portions are threaded together.

4. The apparatus as defined in claim 3 wherein said housing has a first spherical surface and said tire valve stem has a second spherical surface, said first and second spherical surfaces clamping together when said threaded portions are threaded together.

5. The apparatus as defined in claim 1 wherein said threaded fastener comprises a nut and said threaded portion of said threaded fastener comprises an internally threaded passage in said nut and said threaded portion of said valve stem comprises an externally threaded portion of said valve stem.

6. The apparatus as defined in claim 1 wherein said housing has surfaces which engage said rim to block rotation of said housing and said threaded fastener about said axis relative to said rim.

7. The apparatus as defined in claim 1 wherein said tire valve stem has an externally threaded portion and a shoulder projecting radially adjacent said externally threaded portion, and a nut for threaded engagement with said threaded portion to clamp said rim between said nut and said shoulder to secure said valve stem and housing to said rim.

8. The apparatus as defined in claim 1 wherein said surfaces of said threaded fastener and said housing are planar.

9. The apparatus as defined in claim 1 wherein said surfaces of said threaded fastener and said housing block rotation by abutting against each other.

10. Apparatus for mounting on a rim of a vehicle wheel on which a tire may be mounted, said apparatus comprising:

a pressure sensor for sensing the pressure in the tire, said pressure sensor having a housing with a pocket in said housing;

a threaded fastener mounted in said pocket in said housing, said threaded fastener having a threaded portion extending along an axis;

said threaded fastener and said housing having abutting surfaces blocking rotation of said threaded fastener about said axis; and a tire valve stem for projecting through a first opening in the rim and through a second opening in said housing into said pocket, said tire valve stem having a threaded portion for threaded engagement with said threaded portion of said threaded fastener upon relative rotation of said threaded portion of said threaded fastener and said threaded portion of said valve stem about said axis, said tire valve stem and said threaded fastener clamping a part of said housing between said tire valve stem and said threaded fastener when said threaded portion of said threaded fastener and said threaded portion of said valve stem are threaded together.

* * * * *